United States Patent [19]

Lalancette

[11] Patent Number: 4,828,926
[45] Date of Patent: May 9, 1989

[54] ALUMINUM PHOSPHATE BONDED MICAS AND COMPOSITE THEREOF

[75] Inventor: Jean-Marc Lalancette, Sherbrooke, Canada

[73] Assignee: Inotel Inc., Sherbrooke, Canada

[21] Appl. No.: 128,988

[22] Filed: Dec. 4, 1987

[51] Int. Cl.$^4$ .......................... C04B 35/18; F16I 59/14
[52] U.S. Cl. ................................. 428/457; 106/18.26; 106/85; 428/469; 428/472; 501/8; 501/95; 501/106
[58] Field of Search ....................... 428/457, 469, 472; 501/6, 8, 106, 95; 106/18.26, 85

[56] References Cited

U.S. PATENT DOCUMENTS

| | | | |
|---|---|---|---|
| 3,958,582 | 5/1976 | Noda et al. | 106/85 |
| 4,440,865 | 4/1984 | Salazar | 501/95 |
| 4,631,224 | 12/1986 | George et al. | 106/18.26 |
| 4,639,388 | 1/1987 | Ainsworth et al. | 428/469 |

OTHER PUBLICATIONS

Mineralogy, 17 Ed. C. S. Hurlbut, Jr., John Wiley & Sons, Inc. p. 468.

*Primary Examiner*—Upendra Roy
*Attorney, Agent, or Firm*—Margaret M. Duncan

[57] ABSTRACT

The present invention relates to a shaped, molded refractory and insulating product derived from the chemical bonding of muscovite, phlogopite or mixtures thereof with an acid aluminum phosphate having a ratio of Al:P of from 0.286 to 0.666 to which may be added an inert filler, a monofilament or oriented monofibers or woven fibers and which may have a metal cladding adhering to at least one surface of the shaped product.

7 Claims, No Drawings

ALUMINUM PHOSPHATE BONDED MICAS AND COMPOSITE THEREOF

FIELD OF THE INVENTION

The present invention relates to molded refractory and insulating products derived from the chemical bonding of micas with acid aluminum phosphates. It has been found that such products could offer interesting structural, thermal, and electrical properties, while their resistance to heat allows uses up to 1250° C. The technique of molding under pressure leads to good mechanical strength and the resulting products can take a great variety of shapes, such as boards, hemicylindrical pipe covers, electrical circuit components and the like. In the course of the molding, the shaped product can be incorporated in sandwich structures leading to laminated or composite boards. In order to adjust the density, the insulating properties or the mechanical strength of the end product so as to match specific requirements, fillers of various nature can be added to the dry mix, the specifications on such fillers being that they would be less active towards the aluminum phosphate binder than mica and not adversely affected by the binder.

BACKGROUND OF THE INVENTION

The bonding of minerals by phosphoric acid or by phosphates is a well known process. For example, alumina or magnesium oxide can be bonded with mixtures of phosphates and phosphoric acid as reported by Salazar (U.S. Pat. No. 4,440,865). Other minerals such as vermiculite (Ekedahl et al, U.S. Pat. No. 2,919,202), clays (West et al, U.S. Pat. No. 2,660,536), aluminum silicates (Bartha et al, U.S. Pat. No. 4,303,449) and more generally refractory metal oxides (Herbst et al, U.S. Pat. No. 3,316,110) are reported as being bonded into useful products by the action of either phosphoric acid, phosphates of different types or mixtures of phosphates and sulfuric acid. Acid aluminum phosphate, designated also as monoaluminum orthophosphate ($Al(H_2PO_4)_3$) is reported as binder for basic oxides of refractory nature: Adrian et al, Ger. Offen. 2,622,798; Stephen et al, U.S. Pat. No. 4,631,224; Noda et al, U.S. Pat. No. 3,958,582.

In examining the numerous substrates reported as being bonded with phosphates of different types, it was noted that micas such as muscovite or phlogopite were absent from the list of potential materials for the formation of phosphate bonded composites. This situation was unexpected since micas are known for their good thermal and electrical applicances as both refractory and electrical insulators or as "windows" in furnaces and, in the form of powder, as refractories in metallurgical operations. Attempts to bind mica with phosphoric acid as done with magnesium silicates have failed because such a material, particularly muscovite, is inert towards phosphoric acid as can be seen from Danas, Manual of Mineralogy, 17 ed. p. 468. Accordingly, because of the advantageous properties of mica, it would be desirable if a process could be developed to bind finely ground mica such as muscovite and phlogopite with an appropriate binding agent.

SUMMARY OF THE INVENTION

In accordance with the present invention, there is provided a shaped refractory and insulating product which comprises a heated, molded and cured homogeneous mixture of a mica substrate selected from muscovite, phlogopite and a mixture thereof and a binder selected from monoacid aluminum phosphate, diacid aluminum phosphate and mixtures thereof. The cured mixture may also include a filler.

In another aspect of the invention, a monofilament material is incorporated in the shaped refractory and insulation product. In a still further aspect of the invention, oriented monofibers or woven monofibers are also incorporated in the shaped refractory and insulating material.

Finally, the mold in which refractory and insulating products is shaped can be lined on at least one of its surfaces with a metallic lining which after shaping of the green mixture and curing under pressure will produce a product wherein the metal cladding adheres to at least one surface after molding.

DETAILED DESCRIPTION OF THE INVENTION

The Substrate

In accordance with the present invention, the material to be agglomerated into a shaped product is a mica selected from the group consisting of muscovite, phlogopite and a mixture thereof.

The selection of muscovite or phlogopite is based on the intended use. Muscovite is slightly more refractory than phlogopite but phlogopite is cheaper than muscovite and more reactive towards acid aluminum phosphate. Essentially, where the end product is to be subjected to temperatures of from 1250° to 1500° C., muscovite is preferred while for temperatures of less than about 1250° C., phlogopite is suitable.

The particle size of the muscovite or phlogopite is in the range of large particles with an average diameter of from 5 to 0.1 mm. An example, of a suitable phlogopite, there may be mentioned the product sold under the trade mark MICA SUZORITE as grade 40-S and manufactured by Mica Suzorite Product Inc., wherein from 5 to 85% of the particles have an average size of between 350 to 450 microns. When muscovite is used, it is preferably ground to a particle average size of 350 to 450 microns.

The amount of muscovite or phlogopite and mixtures thereof used in accordance with the present invention varies from 95 to 60% by weight with 60 to 80% by weight being preferred. Obviously, the selection of the amount of muscovite or phlogopite depends on the intended use of the finished product.

Also it will be appreciated that the amount of muscovite or phlogopite selected has a bearing on the density or the green mixture which is to be molded to provide the shaped refractory and insulating product of the present invention and the density of the green mixture will have a direct bearing on the heating temperature of the mold and the pressure applied therein as will be discussed further.

The choice between muscovite and phlogopite is made on the basis of the temperature at which the molded product will be used. For example, when the molded product is to be used in a temperature range of 1250°–1500° C., muscovite will be preferred, while at temperatures below 1250° C., phlogopite is preferred. It will be noted that the intended use of the molded product determines the amounts of mica and binder, the molding pressure and temperature and finally, the amount of water permissible in the mica-binder mixture.

The Binder

It is known from Danes, Manual of Mineralogy, 17 ed., p. 468 published by John Wiley & Sons, that mica such as muscovite is inert towards phosphoric acid. In accordance with the present invention, it has surprisingly been found that aluminum monoacid phosphate [$Al_2(HPO_4)_3$] and aluminum diacid phosphate [$Al(H_2PO_4)_3$] can be successfully and advantageously used to bind muscovite and phlogopite.

An important advantage of aluminum phosphate is that it is solid and thus, if desired, can be dry blended with muscovite or phlogopite to form a homogeneous mixture which is essential in order to obtain a superior product. The selection of aluminum phosphate as the binder facilitates the preparation of the green mixture by the use of standard blending equipment such as twin shell mixer or muller. The raw materials can be fed to the mixture as powdered components or can be fed to a ball mill and ground to desired diameter of particles while achieving an homogeneous mixture.

Another advantage in the use of aluminum phosphate as binding agent is its stability at room temperature under dry conditions. Accordingly, the dry mixture being stable can be stored for several days without setting and thus simplify the molding or shaping operation.

When products having a high density are desired, it is recommended to proceed with a dry green mixture. On the other hand, where the insulating properties are to be more important than the mechanical properties, a wet green mixture of aluminum phosphate is prepared with the presence of muscovite or phlogopite or separately prior to mixing. The wet mixing is carried out very easily in opposition to mixing phosphoric acid with other binders. On the other hand, the shelf life of the wet green mixture is shorter than that of the dry mixture and accordingly shaping of the wet mixture must be carried in less than twelve hours after its preparation. The amount of water that is added to provide a wet green mixture is such that the wet mixture has the consistency of a paste.

The amount of aluminum phosphate used in accordance with the present invention can vary from 5 to 40% by weight of the green mixture.

It will be appreciated that acid aluminum phosphate such as $Al(H_2PO_4)_3$ is a much larger molecule than $H_3PO_4$ as can be seen from the following structures:

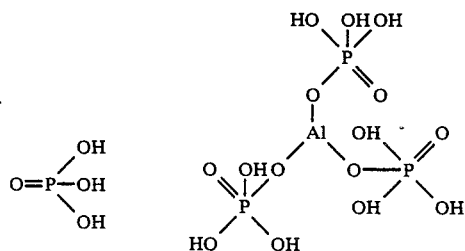

-continued

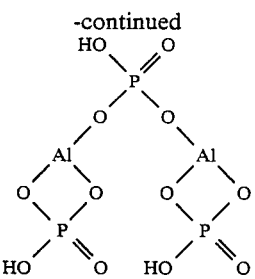

It will be readily appreciated that the acid aluminum phosphates possess improved properties as cross-linking binders when compared to phosphoric acid. The acid aluminum phosphate is prepared by methods known in the art and more particularly by reacting phosphoric acid with alumina followed by drying at 150° C. when a dry formulation is desired. This product is then ground to a particle size of 150 to 200 microns and preferably in the presence of the muscovite or phlogopite and stored in a dry environment. The Al:P ratio in the acid aluminum phosphate can vary from 0.286 to 0.666.

Inert Fillers

In some cases, it may be desirable to include an inert filler in the green mixture in an amount of up to 35% by weight of the green mixture. The sole requirement in the selection of the inert filler is that it does not evolve gas or excessive amount of water vapors upon heating since such evolution would weaken the structure of the shaped product. Accordingly, carbonates which would yield carbon dioxide with the presence of acid aluminum phosphates and clays which would yield large quantities of water vapor upon heating should be avoided unless very porous and highly insulating products are desired. As an example of suitable fillers which do not evolve gas or water vapor, there may be mentioned feldspar, granite ground to fine particles.

Shaping, Heating and Curing

When the homogeneous wet or dry mixture of the muscovite or phlogopite, acid aluminum phosphate and binder if included is obtained, it is shaped in a mold under appropriate pressure and temperature.

As stated previously, the percentages of the ingredients in the dry mix can vary in percentage by weight as follows:
- 95–60%: muscovite or phlogopite
- 5–40%: acid aluminum phosphate with Al:P ratio of 0.286 to 0.666
- 0–35%: inert filler When a dry mixture is used, it is preferred to use an acid aluminum phosphate where the Al:P ratio is between 0.286 to 0.500 in which case the dry mixture in the mold will be subjected to a pressure of between 35 to 350 Kg/cm$^2$ (500 to 5000 psi) and the temperature of the mold will be between 100° and 200° C. for a period of from 2 to 15 minutes.

On the other hand, if a wet mixture is used, the water will represent up to 20% of the weight of the green mass. In this case, the molding step can be done at a lower pressure varying from light compacting such as 0.01 Kg/cm$^2$ up to 17.5 Kg/cm$^2$ (20 to 250 psi) while the time of residence can be substantially longer than those used with a dry mix, for example, from 15 minutes to 2 hours and the temperature can vary from 100° to 200° C.

It should be appreciated that the green mix cannot be directly molded in a steel or aluminum mold because there is a strong tendency for the shaped product to adhere or stick to the metallic walls of the mold. Accordingly, adherence of the shaped product can be avoided by using a metal mold having its inside surface coated with a non-adhering polymer such as TEFLON ® manufactured and sold by E. I. Du Pont Co. or chrome plated on the inside surface of the mold.

On the other hand, the ability of the green mixture to adhere to steel or aluminum can be used to an advantage by providing an aluminum foil or thin steel sheet lining in the mold to generate shaped forms such as boards lined with either aluminum foil or steel sheet thus giving a composite board. In this procedure, the adhesion of the cured mix to aluminum or steel is quite strong and there is no tendency to delaminate.

Depending on the nature of the desired products there are three methods for shaping and forming.

First, for products of high density, the dry green mixture is placed in a mold and heated at 100°–200° C. for a period of 2 to 15 minutes under pressure from 35 to 350 Kg/cm$^2$ (500 to 5000 psi). The resulting product has a density of 1.8 to 2.3 gr/cm$^3$, depending on the formulations used. The total absence of free water in the formulation helps to achive high value of density. If high temperature is contemplated for these high density products, following shaping under pressure a thermal curing around 400° C. for one hour is recommended.

Secondly, for products of intermediate density, between 1.3 and 1.8 gr/cm$^3$, the equivalent dry green mixture is formulated to contain from 5% to 20% of its weight as free water. It is then a thick, non-flowing mass and it must be shaped within twelve hours after its blending. The pressure of molding is then of 1.4 to 17.5 Kg/cm$^2$ (20 to 250 psi) and the temperature of the mold is in the range of 100° to 200° C., the contact under pressure being held during 30 to 120 minutes. Because of lower pressure and the presence of moisture, the density of the end product is lower than what is obtained with very high pressure. Again here, if high temperature uses are considered, a curing at 400° C. for one hour following molding is advisable.

Thirdly, if a product of low density is required of less than 1.3 gr/cm$^3$, the wet green mixture is described above is compacted by vibration and very light pressure (0.01–0.10 Kg/cm$^2$) in a mold and heated for one hour at 150° C., a further curing of one hour at 400° C. being applied if the shaped product is intended for high temperature uses.

Curing

If the shaped product of the present invention is to be used as a refractory or exposed to high temperatures, it should be subjected after molding to a thermal treatment or curing at temperatures of from 300° to 800° C. with a preferred curing temperature of about 400° C. for a period of one hour.

Reinforcement of Molded Product

Another feature of the present invention is that monofilament of fibers such as fiberglass or aluminosilicate or woven monofilament fibers can be placed lengthwise in the mold with the green mix to yield molded products of unexpected high flexural strength. The monofilaments should be 100 to 1000 times longer than the average diameter of muscovite or phlogopite particles. For example, the addition of monofilament fibers can increase the flexural strength from about 2000K newton/m$^2$ up to 24,500K newton/m$^2$ (2000 to 3500 psi).

It is observed that when refractory filaments are used, their properties are retained by the shaped products when exposed to high temperatures, thus enlarging the fields of applications of the products of the present invention to those requiring high tensile strength such as armours, shields, rotating equipments and motors.

USES OF THE INVENTION

The shaped products obtained from the implementation of the invention have many useful applications.

The first application relates to thermal insulation. For this use, a product of low density is desired, the mechanical strength not being of paramount importance. Even with products of low density, a good resistance to abrasion and absence of dust have been noted. For insulation where good mechanical properties are required, reinforcement of the formulation must call upon high density, dry molding.

The strong adhesion of the formulations to longfibers, particularly monofibers or woven fibers give access to mechanically performing shaped products of refractory characters. Then the shaping must be done at moderate to high pressure. High tensile strength at elevated temperatures have been noted, along with much improved resistance to impact and friction.

The shaped products of medium to high density are good electric insulators. Since they can operate at temperatures above 1000° C., there are many fields of application that can be foreseen such as arc chutes, supports in electrical heating circuits, cladding of electric or magnetic components, arc furnaces, induction heating and the like, including brake lining.

The possibility of obtaining shaped products with a metallic coating is of interest where composite structures are required. The shape of the cladding can be designed in such a fashion as to contribute structurally to the overall mechanical properties of the composite.

When ground or firmly divided, the shaped material can be used as refractory filler or sand in high temperature environments.

The present invention will be more readily understood by referring to the following examples which are given to illustrate the invention.

EXAMPLE 1

Basic Formulations

1.A The preparation of wet and dry binding agents.

The preparation of the acid aluminum phosphate was made from alumina obtained by calcining aluminum oxide trihydrate Al(OH)$_3$ at 500° C. for 24 hours. This alumina 407.8 g was placed in a shallow vessel and heated at 98° C. in the presence of 2734.8 g of 85% phosphoric acid under good stirring. After the initial reaction had subsided, the heating at 98° C. was maintained for 30 minutes. Upon cooling, the wet acid aluminum phosphate had the consistency of a sirupy liquid. Half of this material was placed in a Teflon ® beaker of 1000 ml and heated in a ventilated furnace at 150° C. for 16 hours. The resulting solid white material weighted 1272.5 g, in agreement with the formulation of the dry aluminum acid phosphate [(Al(H$_2$PO$_4$)$_3$]. The other half of the initial starting mixture was used as such and represents the wet binding agent.

1.B The dry binding of mica.

A mixture of acid aluminum phosphate ($Al(H_2PO_4)_3$ to P ratio:0.333) previously ground and screened to particle size of less than 0.1 mm was prepared by stirring in a Waring ® blendor for one minute with a 300 g (83%) portion of Mica Suzorite ®, grade 40-S having an average particle size of the order of 400 microns with a portion of 60 g (17%) of the ground acid aluminum phosphate described above. The resulting mixture was placed in a rectangular mold of 10 cm by 5 cm and a pressure of 350 $Kg/cm^2$ was applied for 10 minutes while the mold was heated at 150° C. The mold was lined with Teflon ® sheets 1.0 mm thick to prevent sticking. The molded sample was then extracted from the mold and heated at 400° C. for one hour. The density of the molded sample was 2.1; its flexual strength was 17,500K $newton/m^2$ (2,500 psi). A voltage of 10,000 volts was applied across a sample which had a thickness of 1.9 cm after machining. There was no measurable current flow, indicating a good dielectric behavior.

1.C The wet binding of mica.

A 75 g (20%) portion of the wet binding agent prepared as described in 1.A and having a free water content of 15 g (20%) was blended with 300 g (80%) of Mica Suzorite ® grade 40-S by tumbling the mix in a cylindrical mixer of 2 liter capacity for one hour. The visual inspection of the mix indicated a very homogeneous distribution of the binding agent throughout the mass. The molding was done in the same mold as in 1.B, the molding pressure being 75 $Kg/cm^2$. The venting of the charge was made every two minutes for the first 10 minutes and the duration of the molding, at 150° C. was 70 minutes. After this molding, the sample was cured in an oven at 400° C. for one hour. The density of the resulting product was 1.6 $gr/cm^3$ and its thermal conductivity measured at 25° C. was 0.15 $w/m.m^2.K$ which indicates good thermal conductivity which is adequate for an insulating material.

EXAMPLE 2

Formulation with Muscovite

Two samples were prepared as described in example 1.B and 1.C except that muscovite, ground to 400 microns, was used instead of phlogopite. In the case of dry bonding (1.B) the flexual strength of the end product was 15,400K $newton/m^2$ (2,200 psi) while with wet bonding (1.C) the flexual strength was 14,000 K $newton/m^2$ (2,000 psi).

EXAMPLE 3

Formulation at Very Low Pressure

A sample was prepared as in example 1.C except that at the molding stage the applied pressure was of the order of 0.08 $kg/cm^2$ (1 psi) and the time of curing in the mold at 150° C. was two hours. The resulting samples had a flexual strength of 3,500K $newton/m^2$ (500 psi).

EXAMPLE 4

Reinforcement with glass fiber monofilaments

A sample was prepared as in Example 1.B except that 10% of the reaction mixture was made in the form of monofilaments of Pyrex ® glass, 0.5 mm in diameter and 10 cm in length, placed lengthwise in the mold, with the green mix. The resulting product was showing a flexual strength of 24,500K $newton/m^2$ (3500 psi).

EXAMPLE 5

Formulation Enriched in Phosphate

A sample was prepared as in Example 1.C except that the binding agent was raised to 85 g (22%) of a wet binding mixture containing 18% of free water and an Al to $PO_4$ ratio of 0.286. The flexual strength of the end product was 18,200K $newton/m^2$ (2600 psi).

EXAMPLE 6

Addition of Filler (6.1) Example 1.B was repeated as described except that 10% of the green mixture was made of $Al(OH)_3$. The flexual strength of the sample was 18,900K $newton/m^2$ (2,700 psi).

(6.2) Example 2.C was repeated as described except that 8% of the green mixture was made of $Al_2O_3$ prepared by calcining $Al(OH)_3$ at 500° C. The flexual strength of the end product was 16,100K $newton/m^2$ (2,300 psi).

(6.3) Example 2.C was repeated as described except that 20% of the green mixture before molding was made of feldspar with an average particle diameter of the order of 450 microns. The flexual strength of the resulting product was 4900K $newton/m^2$ (700 psi).

EXAMPLE 7

Metal Cladding

Example 1.C was repeated as described and the bottom of the mold was lined with a sheet of aluminum 0.5 mm thick while the top of the charge was covered with a thin sheet of mild steel 0.2 mm thick. After molding, the metal coatings could not be removed without breaking the sample.

EXAMPLE 8

Proceeding in accordance with Example 1.B and replacing the acid aluminum phosphate with phosphoric acid a paste is obtained, which even after curing under pressure as in Example 2, yields a wet mass having no consistency.

What is claimed is:

1. A shaped refractory and insulating product comprising a compressed and cured homogeneous mixture of a substance consisting of a mica selected from the group consisting of muscovite, phlogopite and mixtures thereof and an acid aluminum phosphate having a ratio of Al:P of from 0.286 to 0.666 as a binder.

2. A shaped product as in claim 1, wherein the substance is from 95 to 60% by weight of the mixture and the binder is from 5 to 40% by weight.

3. A shaped product as in claim 1, wherein the mixture includes an inert filer in an amount of from 0 to 35% by weight.

4. A shaped product as in claim 1, wherein from 0.1 to 25% by weight of a monofilament is incorporated in the green mixture of substance and binder prior to shaping.

5. A shaped product as in claim 4, wherein the monofilament is selected from oriented monofibers and woven monofibers.

6. A shaped refractory and insulating product comprising a compressed and cured mixture of from 95 to 60% by weight of a substance consisting of a mica selected from muscovite, phlogopite and mixtures thereof, from 5 to 40% by weight of an acid aluminum phosphate having a ratio of Al to P of from 0.286 to 0.666 and from 0 to 35% by weight of an inert filler.

7. A shaped refractory and insulating product comprising a compressed and cured mixture of from 95 to 60% by weight of a substance consisting of a mica selected from muscovite, phlogopite and mixtures thereof, from 5 to 40% by weight of an acid aluminum phosphate having a ratio of Al to P of from 0.286 to 0.666, from 0 to 35% by weight of an inert filler and from 0.1 to 25% by weight of a monofilament incorporated within the shaped product.

* * * * *